(12) United States Patent
Iwasaki

(10) Patent No.: US 9,461,303 B2
(45) Date of Patent: Oct. 4, 2016

(54) ELECTRODE BODY, ALL SOLID STATE BATTERY, AND METHOD FOR PRODUCING COATED ACTIVE MATERIAL

(75) Inventor: Masahiro Iwasaki, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 406 days.

(21) Appl. No.: 14/111,283

(22) PCT Filed: May 13, 2011

(86) PCT No.: PCT/JP2011/061082
§ 371 (c)(1),
(2), (4) Date: Oct. 11, 2013

(87) PCT Pub. No.: WO2012/157046
PCT Pub. Date: Nov. 22, 2012

(65) Prior Publication Data
US 2014/0057180 A1    Feb. 27, 2014

(51) Int. Cl.
*H01M 4/36*        (2006.01)
*H01M 4/62*        (2006.01)
*H01M 10/0562*    (2010.01)

(52) U.S. Cl.
CPC .............. *H01M 4/366* (2013.01); *H01M 4/62* (2013.01); *H01M 10/0562* (2013.01)

(58) Field of Classification Search
None
See application file for complete search history.

(56) References Cited

U.S. PATENT DOCUMENTS

| | | | |
|---|---|---|---|
| 2004/0253518 A1 | 12/2004 | Hosoya et al. | |
| 2006/0071198 A1* | 4/2006 | Paulsen | C01G 45/1228 252/500 |
| 2009/0081554 A1 | 3/2009 | Takada et al. | |
| 2009/0162750 A1* | 6/2009 | Kawakami | H01G 11/46 429/218.1 |
| 2009/0197182 A1 | 8/2009 | Katoh | |
| 2010/0216030 A1* | 8/2010 | Maeda | H01M 4/366 429/319 |
| 2011/0086274 A1 | 4/2011 | Chang et al. | |
| 2012/0052383 A1* | 3/2012 | Ota | H01M 4/0404 429/211 |

FOREIGN PATENT DOCUMENTS

| | | |
|---|---|---|
| JP | A-2001-273928 | 10/2001 |
| JP | A-2003-59492 | 2/2003 |
| JP | 2004-319129 A | 11/2004 |
| JP | A-2006-107963 | 4/2006 |
| JP | A-2009-181921 | 8/2009 |
| JP | A-2009-193940 | 8/2009 |
| JP | A-2010-92828 | 4/2010 |
| JP | A-2010-225309 | 10/2010 |
| WO | 2007/004590 A1 | 1/2007 |
| WO | WO 2010/137381 | * 12/2010 |

* cited by examiner

*Primary Examiner* — Alix Eggerding
(74) *Attorney, Agent, or Firm* — Oliff PLC

(57) ABSTRACT

The problem of the present invention is to provide an electrode body in which electron conductivity of a coated active material improves and reaction resistance decreases. The present invention solves the above-mentioned problem by providing an electrode body comprising a coated active material having an oxide active material and a coat layer for coating the surface of the above-mentioned oxide active material, containing an oxide solid electrolyte material, and a sulfide solid electrolyte material contacting with the above-mentioned coated active material, characterized in that the above-mentioned coat layer contains a conductive assistant.

4 Claims, 4 Drawing Sheets

ELECTRODE BODY, ALL SOLID STATE BATTERY, AND METHOD FOR PRODUCING COATED ACTIVE MATERIAL

TECHNICAL FIELD

The present invention relates to an electrode body in which electron conductivity of a coated active material improves and reaction resistance decreases.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

In the field of such an all solid state battery, the intention of improving the performance of all the solid state battery has been conventionally attempted while noticing an interface between an active material and a solid electrolyte material. For example, in Patent Literature 1, an electrode body containing an active material whose surface is coated by 70% or more with a first solid electrolyte such as lithium niobate and a second solid electrolyte such as a sulfide is disclosed. This intends to decrease interface resistance between the active material and the second solid electrolyte such as a sulfide by coating the surface of the active material with the first solid electrolyte such as lithium niobate.

On the other hand, in Patent Literature 2, a polymer battery such that the surface of an electrode active material for the polymer battery is compactly coated with a coating layer containing a lithium conductive inorganic solid electrolyte and conductive fiber is disclosed.

Citation List

Patent Literature

Patent Literature 1: Japanese Patent Application Publication (JP-A) No. 2009-193940
Patent Literature 2: JP-A No. 2006-107963

SUMMARY OF INVENTION

Technical Problem

As described in Patent Literature 1, an electrode body having a coated active material, in which the surface of an active material is coated with lithium niobate, and a sulfide solid electrolyte may decrease interface resistance between the active material and the sulfide solid electrolyte. However, in such an electrode body, lithium niobate is so low in electron conductivity that electron conductivity of the coated active material lowers due to a coat layer made of lithium niobate and reaction resistance increases. The present invention has been made in view of the above-mentioned actual circumstances, and the main object thereof is to provide an electrode body in which electron conductivity of a coated active material improves and reaction resistance decreases.

Solution to Problem

In order to solve the above-mentioned problem, the present invention provides an electrode body comprising a coated active material having an oxide active material and a coat layer for coating the surface of the above-mentioned oxide active material, containing an oxide solid electrolyte material, and a sulfide solid electrolyte material contacting with the above-mentioned coated active material, characterized in that the above-mentioned coat layer contains a conductive assistant.

According to the present invention, the inclusion of the conductive assistant in the coat layer allows the electrode body in which electron conductivity of the coated active material improves and reaction resistance decreases. Also, in the electrode body of the present invention, the surface of the oxide active material is coated with the coat layer containing an oxide solid electrolyte material, so that a high resistive layer may be restrained from being formed by a reaction between the above-mentioned oxide active material and sulfide solid electrolyte material to allow interface resistance to be restrained from increasing.

In the above-mentioned invention, the above-mentioned coat layer is preferably in a filmy shape with no grain boundaries. The reason therefor is to allow the coated active material with no grain boundary resistivity.

In the above-mentioned invention, the above-mentioned conductive assistant is preferably a carbon nanotube. The reason therefor is that the conductive assistant may be appropriately used for the thin coat layer of 100 nm or less.

Also, the present invention provides an all solid state battery comprising a cathode active material layer containing a cathode active material, an anode active material layer containing an anode active material, and a solid electrolyte layer formed between the above-mentioned cathode active material layer and the above-mentioned anode active material layer, characterized in that at least one of the above-mentioned cathode active material layer and the above-mentioned anode active material layer is the above-mentioned electrode body.

According to the present invention, the use of the above-mentioned electrode body allows all the solid state battery in which electron conductivity of the coated active material improves and reaction resistance decreases.

Also, the present invention provides a method for producing a coated active material, comprising steps of: a preparation step of preparing a coating liquid for forming a coat layer obtained by mixing an oxide solid electrolyte material precursor solution containing a raw material of an oxide solid electrolyte material and a conductive assistant dispersion liquid containing a conductive assistant, and a coating step of coating and drying the above-mentioned coating liquid for forming a coat layer on an oxide active material to thereby form a coat layer for coating the surface of the above-mentioned oxide active material.

According to the present invention, the use of the coating liquid for forming a coat layer obtained by mixing the oxide solid electrolyte material precursor solution and the conductive assistant dispersion liquid allows the coated active material in which interface resistance may be restrained from increasing and electron conductivity improves.

Advantageous Effects of Invention

The present invention produces the effect such as to allow an electrode body in which electron conductivity of a coated active material improves and reaction resistance decreases.

DESCRIPTION OF EMBODIMENTS

Figure 1:
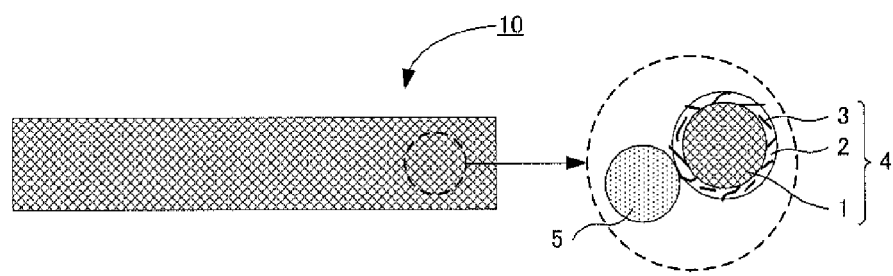
FIG. 1 is a schematic cross-sectional view showing an example of an electrode body of the present invention.

An electrode body, an all solid state battery and a method for producing a coated active material of the present invention are hereinafter described in detail.

A. Electrode Body

First, an electrode body of the present invention is described. The electrode body of the present invention is an electrode body comprising a coated active material having an oxide active material and a coat layer for coating the surface of the above-mentioned oxide active material, containing an oxide solid electrolyte material, and a sulfide solid electrolyte material contacting with the above-mentioned coated active material, characterized in that the above-mentioned coat layer further contains a conductive assistant.

According to the present invention, the inclusion of the conductive assistant in the coat layer allows the electrode body in which electron conductivity of the coated active material improves and reaction resistance decreases. Also, in the electrode body of the present invention, the surface of the oxide active material is coated with the coat layer containing an oxide solid electrolyte material, so that the above-mentioned oxide active material and sulfide solid electrolyte material may be restrained from reacting to allow interface resistance to be restrained from increasing.

In order to restrain a high resistive layer from being formed by a reaction between the oxide active material and the sulfide solid electrolyte material, it has been conventionally known that the above-mentioned oxide active material is coated with the coat layer containing an oxide solid electrolyte material. However, electron conductivity of the coat layer is so low that extremely high fastening power is required for producing a battery by using such a coated active material. As a result, a problem is caused in upsizing and durability of a battery. On the contrary, in the present invention, the addition of the conductive assistant to the coat layer may intend to improve the electron conductivity and to decrease the fastening power.

Incidentally, it is conceived that a material previously having ion conductivity and electron conductivity is used for the coat layer instead of the conventional coat layer with low electron conductivity; however, in the coated active material provided with the coat layer made of such a material, it is conceived that resistance becomes high by reason of the following assumed mechanism. That is to say, when electron conductivity exists in the whole coat layer, electric potential of the active material propagates up to the outside of the coat layer to bring a possibility of deteriorating the sulfide solid electrolyte material. It is found from this point that the coat layer has two roles such as to restrain a chemical reaction between the oxide active material and the sulfide solid electrolyte material and to provide a difference in electric potential therebetween. In the present invention, it is conceived that the coat layer having a portion high only in ion conductivity and a portion high only in electron conductivity in the case of locally observing the coat layer may be obtained by providing the coat layer in which the oxide solid electrolyte material and the conductive assistant are mixed, and the above-mentioned two roles of the coat layer may be filled. In addition, the present invention has the advantage that the range of material selection for the coat layer extends.

FIG. 1 is a schematic cross-sectional view showing an example of the electrode body of the present invention. An electrode body 10 shown in FIG. 1 comprises a coated active material 4 having an oxide active material 1 and a coat layer 2 for coating the surface of the oxide active material 1, containing an oxide solid electrolyte material, and a sulfide solid electrolyte material 5 contacting with the coated active material 4. The present invention is greatly characterized in that the coat layer 2 has a conductive assistant 3.

The electrode body of the present invention is hereinafter described in each constitution.

1. Coated Active Material

First, the coated active material in the present invention is described. The coated active material in the present invention has an oxide active material and a coat layer for coating the surface of the above-mentioned oxide active material, containing an oxide solid electrolyte material.

(1) Coat Layer

The coat layer in the present invention coats the surface of the oxide active material and contains an oxide solid electrolyte material. Also, the present invention is greatly characterized in that the above-mentioned coat layer contains a conductive assistant.

The conductive assistant in the present invention is not particularly limited if the conductive assistant has electron conductivity, but examples thereof include a carbon material and a metallic material. Also, examples of the shape of the conductive assistant include a granular shape and a fibrous shape. Specific examples of the conductive assistant include carbon nanotube (CNT), vapor grown carbon fiber (VGCF), granular carbon, metal powder and metal fiber; above all, preferably CNT. The reason therefor is that the thickness of the coat layer of the coated active material is preferably thin in the electrode body of the present invention as described later, and CNT may be appropriately used for the thin coat layer of 100 nm or less by reason of having a diameter in a nm order. CNT used for the present invention is not particularly limited but may be single-wall CNT (SWNT) or multi-wall CNT (MWNT) such as double-wall CNT (DWNT). CNT may be obtained by an arc discharge method, a laser evaporation method, a chemical vapor deposition method (CVD method), a hydrocarbon catalytic cracking method, and other methods.

Figure 2A:
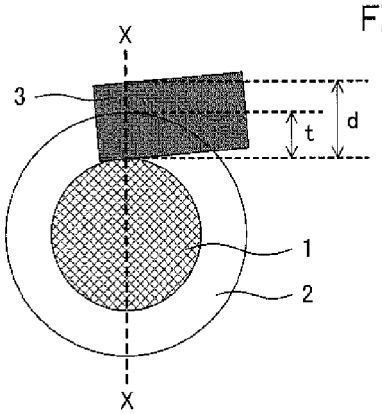
FIGS. 2A to 2D are each a schematic view explaining a relation between an outside diameter of a conductive assistant and a thickness of a coat layer in an electrode body of the present invention.
Figure 2B:
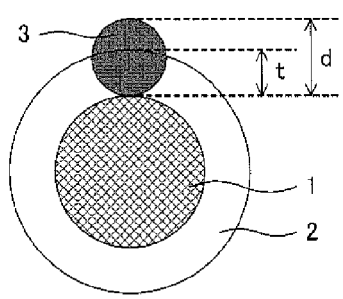
Figure 2C:
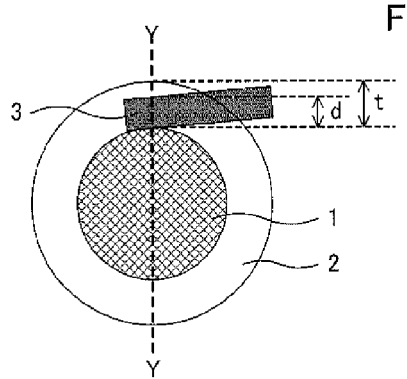
Figure 2D:
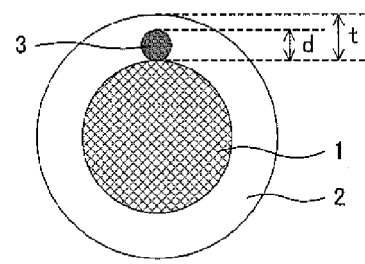

Also, the outside diameter of the conductive assistant in the present invention is, for example, preferably within a range of 1 nm to 150 nm, more preferably within a range of 1 nm to 50 nm, and far more preferably within a range of 1 nm to 10 nm. The reason therefor is that too large outside diameter of the conductive assistant causes the conductive assistant to easily peel off the coat layer, while too small outside diameter of the conductive assistant causes an electron conduction path to be secured with difficulty in the coat layer. For example, in the case of using CNT as the conductive assistant, when the outside diameter "d" of the conductive assistant 3 in the X-X line is larger than the thickness "t" of the coat layer 2 as shown in FIG. 2A, the conductive assistant 3 projects from the coat layer 2 as shown in FIG. 2B, so that an electron conduction path is easily secured but the conductive assistant 3 peels easily off the coat layer 2; meanwhile, when the outside diameter "d" of the conductive assistant 3 in the Y-Y line is smaller than the thickness "t" of the coat layer 2 as shown in FIG. 2C, the conductive assistant 3 does not project from the coat layer 2 as shown in FIG. 2D, so that an electron conduction path is secured with difficulty but the conductive assistant 3 peels off the coat layer 2 with difficulty. Incidentally, FIG. 2S is an X-X line cross-sectional view of FIG. 2A, and FIG. 2D is a Y-Y line cross-sectional view of FIG. 2C.

Also, the electron conductivity of the conductive assistant in the present invention is, for example, preferably 1 S/cm or more, and more preferably 10 S/cm or more.

On the other hand, the oxide solid electrolyte material in the present invention is ordinarily low and stable in reactivity with the sulfide solid electrolyte material as compared with the oxide active material. The oxide solid electrolyte material in the present invention is not particularly limited if the oxide solid electrolyte material is an ion conductive oxide which is lower in reactivity with the sulfide solid electrolyte material than the oxide active material. For example, in the case where the electrode body of the present invention is used for an all solid lithium battery, the above-mentioned ion conductive oxide preferably has a Li element, A element and O element. The above-mentioned A is not particularly limited but examples thereof include P, B, Si, Ge, Nb, Ti and Zr. In addition, specific examples of such an ion conductive oxide include $Li_3PO_4$, $Li_3BO_3$, $Li_4SiO_4$, $Li_4GeO_4$, $LiNbO_3$, $LiTiO_3$ and $Li_2ZrO_3$. Also, the above-mentioned oxide solid electrolyte material may be a composite compound of the above-mentioned ion conductive oxide, and examples of such a composite compound include $Li_3BO_3$—$Li_4SiO_4$—$Li_3PO_4$—$Li_4SiO_4$ and $Li_3PO_4$—$Li_4GeO_4$.

Also, in the case where the electrode body of the present invention is used for an all solid lithium battery, the Li ion conductivity of the oxide solid electrolyte material is, for example, preferably $1 \times 10^{-6}$ S/cm or more, and more preferably $1 \times 10^{-5}$ S/cm or more.

Figure 3A:
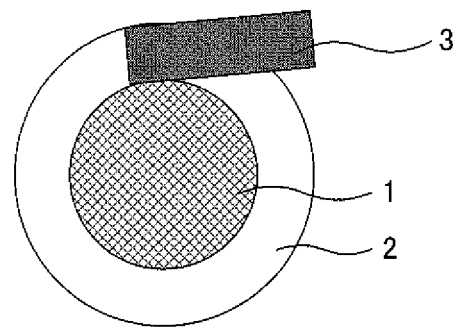
FIGS. 3A to 3C are each a schematic cross-sectional view exemplifying a disposition aspect of a conductive assistant in a coat layer in an electrode body of the present invention.
Figure 3B:
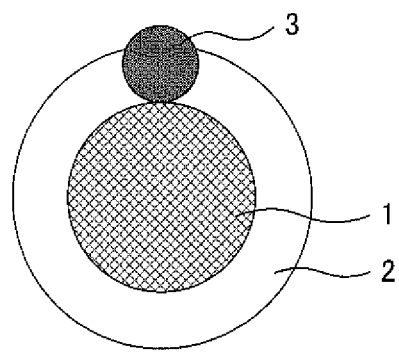
Figure 3C:
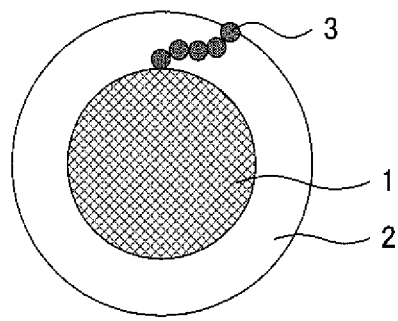

The disposition aspect of the conductive assistant in the coat layer in the present invention is not particularly limited if the disposition aspect may perform the effect of the present invention, but the disposition aspect is preferably such that one end of the conductive assistant contacts with the oxide active material and the other end of the conductive assistant projects from the coat layer. For example, in the case where the conductive assistant is in a fibrous shape, the disposition aspect may be such that one end of the conductive assistant 3 contacts with the oxide active material 1 and the other end of the conductive assistant 3 projects from the coat layer 2, as shown in FIG. 3A; for example, in the case where the conductive assistant is in a granular shape, the disposition aspect may be such that one portion of the conductive assistant 3 contacts with the oxide active material 1 and one portion of the conductive assistant 3 projects from the coat layer 2, as shown in FIG. 3B, or such that the conductive assistant 3 contacting with the oxide active material 1 and the conductive assistant 3 projecting from the coat layer 2 are connected by the plural conductive assistants 3, as shown in FIG. 3C. Also, the conductive assistant is preferably mixed with the oxide solid electrolyte material and dispersed in the coat layer. Incidentally, in the after-mentioned Example, CNT exists in the coat layer basically in a state of lying; part of CNT projects from the coat layer and part of CNT contacts with the active material.

The content of the conductive assistant in the coat layer is not particularly limited if the content is within a range such as to allow electron conductivity of the coated active material to be improved. Above all, in the present invention, the ratio of the conductive assistant to the oxide solid electrolyte material is preferably within a range of 0.1% by weight to 20% by weight, and more preferably within a range of 1% by weight to 5% by weight. The reason therefor is that too high ratio of the conductive assistant to the oxide solid electrolyte material brings a possibility that the coat layer becomes a high resistive layer for the reason that the conductive assistant is ordinarily low in ion conductivity, while too low ratio of the conductive assistant to the oxide solid electrolyte material brings a possibility that electron conductivity of the coated active material may not sufficiently be improved.

The thickness of the coat layer is not particularly limited if the thickness is a thickness such as to cause no reactions between the oxide active material and the sulfide solid electrolyte material and to function sufficiently as the coat layer, but is, for example, preferably within a range of 0.1 nm to 100 nm, and more preferably within a range of 1 nm to 20 nm. The reason therefor is that too thin coat layer brings a possibility that an uncoated portion of the oxide active material and the sulfide solid electrolyte material react, while too thick coat layer brings a possibility that ion conductivity and electron conductivity deteriorate. Incidentally, examples of a measuring method for the thickness of the coat layer include a transmission electron microscope (TEM). Also, the coverage factor of the coat layer on the surface of the oxide active material is preferably high from the viewpoint of restraining interface resistance from increasing; specifically, preferably 90% or more, and more preferably 95% or more. Also, the coat layer may cover the whole surface of the oxide active material. Incidentally, examples of a measuring method for the coverage factor of the coat layer include a transmission electron microscope (TEM) and an X-ray photoelectron spectroscopy (XPS).

Also, the coat layer in the present invention is preferably in a filmy shape with no grain boundaries. The reason therefor is to allow the coated active material with no grain boundary resistivity. Here, it is confirmed by a transmission electron microscope (TEM) that the coat layer is in a filmy shape with no grain boundaries. The coat layer in a filmy shape with no grain boundaries may be formed by a liquid-phase method (a wet method) such as a sol-gel method. Also, the case of forming the coat layer by using a wet method has the advantages that the conductive assistant (such as CNT) may be restrained from aggregating as compared with a dry method and dispersibility of the conductive assistant in the coat layer is improved. Incidentally, in the above-mentioned Patent Literature 2, the coat layer is formed by performing coating treatment with a mixer mill. It is conceived that such a mechanical coating method allows particles of the solid electrolyte to be supported on the surface of the active material, but may not form the coat layer in a filmy shape with no grain boundaries to form the coat layer in which the granular solid electrolyte gathers, so that grain boundary resistivity is caused.

(2) Oxide Active Material

The oxide active material in the present invention varies with kinds of a conductive ion of an all solid state battery for which the intended electrode body is used. For example, in the case where the electrode body of the present invention is used for an all solid lithium secondary battery, the oxide active material occludes and releases a Li ion. Also, the oxide active material in the present invention ordinarily reacts with the sulfide solid electrolyte material to form a high resistive layer. The formation of a high resistive layer may be confirmed by a transmission electron microscope (TEM) and an energy-dispersive X-ray spectroscopy (EDX).

The oxide active material in the present invention is not particularly limited if the oxide active material may react with the sulfide solid electrolyte material to form a high resistive layer. Examples of the oxide active material used as a cathode active material of an all solid lithium battery include an oxide active material represented by a general formula $Li_xM_yO_z$ (M is a transition metallic element, x=0.02 to 2.2, y=1 to 2 and z=1.4 to 4). In the above-mentioned general formula, M is preferably at least one kind selected from the group consisting of Co, Mn, Ni, V and Fe, and more preferably at least one kind selected from the group consisting of Co, Ni and Mn. Specific examples of such an oxide active material include rock salt bed type active materials such as $LiCoO_2$, $LiMnO_2$, $LiNiO_2$, $LiVO_2$ and $LiNi_{1/3}Co_{1/3}Mn_{1/3}O_2$, and spinel type active materials such as $LiMn_2O_4$ and $Li(Ni_{0.5}Mn_{1.5})O_4$. Also, examples of the oxide active material except the above-mentioned general formula of $Li_xM_yO_z$ include olivine type active materials such as $LiFePO_4$ and $LiMnPO_4$, and Si-containing active materials such as $Li_2FeSiO_4$ and $Li_2MnSiO_4$.

On the other hand, examples of the oxide active material used as an anode active material of an all solid lithium battery include $Nb_2O_5$, $Li_4Ti_5O_{12}$ and SiO. Incidentally, the oxide active material in the present invention may be used as a cathode active material or an anode active material. The reason therefor is that whether the active material becomes a cathode active material or an anode active material is determined by electrical potential of the active materials to be combined.

Examples of the shape of the oxide active material in the present invention include a particulate shape, preferably a perfectly spherical shape or an elliptically spherical shape, above all. Also, in the case where the above-mentioned oxide active material is in a particulate shape, the average particle diameter thereof ($D_{50}$) is, for example, preferably within a range of 0.1 μm to 50 μm.

(3) Coated Active Material

The content of the coated active material in the electrode body of the present invention is, for example, preferably within a range of 10% by weight to 99% by weight, and more preferably within a range of 20% by weight to 90% by weight. Incidentally, a method for forming the coated active material is described in detail in the after-mentioned 'C. Method for producing coated active material'.

2. Sulfide Solid Electrolyte Material

Next, the sulfide solid electrolyte material in the present invention is described. The sulfide solid electrolyte material in the present invention contacts with the above-mentioned coated active material, and ordinarily reacts with the oxide active material to form a high resistive layer. The formation of a high resistive layer may be confirmed by a transmission electron microscope (TEM) and an energy-dispersive X-ray spectroscopy (EDX).

The sulfide solid electrolyte material in the present invention is not particularly limited if the sulfide solid electrolyte material reacts with the oxide active material to form a high resistive layer. In the case where the electrode body of the present invention is used for an all solid lithium battery, examples of the sulfide solid electrolyte material include $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ ("m" and "n" are positive numbers. Z is any of Ge, Zn or Ga.), $Li_2S$—$GeS_2$, $Li_2S$—$SiS_2$—$Li_3PO_4$, and $Li_2S$—$SiS_2$—$Li_xMO_y$ ("x" and "y" are positive numbers. M is any of P, Si, Ge, B, Al, Ga or In). Incidentally, the description of the above-mentioned "$Li_2S$—$P_2S_5$" signifies the sulfide solid electrolyte material obtained by using a raw material composition containing $Li_2S$ and $P_2S_5$, and other descriptions signify similarly.

Also, in the case where the sulfide solid electrolyte material is obtained by using a raw material composition containing $Li_2S$ and $P_2S_5$, the ratio of $Li_2S$ to the total of $Li_2S$ and $P_2S_5$ is, for example, preferably within a range of 70 mol % to 80 mol 0, more preferably within a range of 72 mol % to 78 mol %, and far more preferably within a range of 74 mol % to 76 mol %. The reason therefor is to allow the sulfide solid electrolyte material having an ortho-composition or a composition in the neighborhood of it and allow the sulfide solid electrolyte material with high chemical stability. Here, ortho generally signifies oxo acid which is the highest in degree of hydration among oxo acids obtained by hydrating the same oxide. In the present invention, a crystal composition to which $Li_2S$ is added most among sulfides is called an ortho-composition. $Li_3PS_4$ corresponds to the ortho-composition in the $Li_2S$—$P_2S_5$ system. In the case of an $Li_2S$—$P_2S_5$-based sulfide solid electrolyte material, the ratio of $Li_2S$ and $P_2S_5$ such as to allow the ortho-composition is $Li_2S:P_2S_5$=75:25 on a molar basis. Incidentally, also in the case of using $Al_2S_3$ and $B_2S_3$ instead of $P_2S_5$ in the above-mentioned raw material composition, the preferable range is the same. $Li_3AlS_3$ corresponds to the ortho-composition in the $Li_2S$—$Al_2S_3$ system and $Li_3BS_3$ corresponds to the ortho-composition in the $Li_2S$—$B_2S_3$ system.

Also, in the case where the sulfide solid electrolyte material is obtained by using a raw material composition containing $Li_2S$ and $SiS_2$, the ratio of $Li_2S$ to the total of $Li_2S$ and $SiS_2$ is, for example, preferably within a range of 60 mol % to 72 mol %, more preferably within a range of 62 mol % to 70 mol %, and far more preferably within a range of 64 mol % to 68 mol %. The reason therefor is to allow the sulfide solid electrolyte material having an ortho-composition or a composition in the neighborhood of it and allow the sulfide solid electrolyte material with high chemical stability. $Li_4SiS_4$ corresponds to the ortho-composition in the $Li_2S$—$SiS_2$ system. In the case of an $Li_2S$—$SiS_2$-based sulfide solid electrolyte material, the ratio of $Li_2S$ and $SiS_2$ such as to allow the ortho-composition is $Li_2S:SiS_2$=66.6:33.3 on a molar basis. Incidentally, also in the case of using $GeS_2$ instead of $SiS_2$ in the above-mentioned raw material composition, the preferable range is the same. $Li_4GeS_4$ corresponds to the ortho-composition in the $Li_2S$—$GeS_2$ system.

Also, in the case where the sulfide solid electrolyte material is obtained by using a raw material composition containingLiX (X=Cl, BrandI), the ratio of LiX is, for example, preferably within a range of 1 mol % to 60 mol %, more preferably within a range of 5 mol % to 50 mol %, and far more preferably within a range of 10 mol % to 40 mol %.

Also, the sulfide solid electrolyte material may be sulfide glass, crystallized sulfide glass, or a crystalline material (a material obtained by a solid phase method).

Examples of the shape of the sulfide solid electrolyte material in the present invention include a particulate shape, preferably a perfectly spherical shape or an elliptically spherical shape, above all. Also, in the case where the above-mentioned sulfide solid electrolyte material is in a particulate shape, the average particle diameter thereof ($D_{50}$) is not particularly limited but preferably 40 μm or less, more preferably 20 μm or less, and far more preferably 10 μm or less. The reason therefor is to easily intend to improve filling factor of the electrode body of the present invention. On the other hand, the above-mentioned average particle diameter is preferably 0.01 μm or more, and more preferably 0.1 μm or more. Incidentally, the above-mentioned average particle diameter may be determined by a granulometer, for example. Also, in the case where the sulfide solid electrolyte material is an Li ion conductor, Li ion conductivity at normal temperature is, for example, preferably $1\times10^{-5}$ S/cm or more, and more preferably $1\times10^{-4}$ S/cm or more.

The content of the sulfide solid electrolyte material in the electrode body of the present invention is, for example, preferably within a range of 1% by weight to 90% by weight, and more preferably within a range of 10% by weight to 80% by weight.

3. Electrode Body

The electrode body of the present invention comprises at least the above-mentioned coated active material and sulfide solid electrolyte material, and may further comprise a binder and a conductive assistant as required. Examples of the binder include fluorine-containing binders such as PTFE and PVDF. On the other hand, examples of the conductive assistant include acetylene black, Ketjen Black and carbon fiber. Also, the thickness of the electrode body of the present invention varies with kinds of an intended all solid state battery and uses of the electrode body, and is preferably within a range of 0.1 μm to 1000 μm, for example.

The electrode body of the present invention is ordinarily used for an all solid state battery. Incidentally, kinds of an all solid state battery are described in the after-mentioned 'B. All solid state battery'; therefore, the description herein is omitted. Also, examples of a method for producing the electrode body of the present invention include a method for compression-molding a composition containing the above-mentioned coated active material and the above-mentioned sulfide solid electrolyte material.

B. All Solid State Battery

Next, an all solid state battery of the present invention is described. All the solid state battery of the present invention is an all solid state battery comprising a cathode active material layer containing a cathode active material, an anode active material layer containing an anode active material, and a solid electrolyte layer formed between the above-mentioned cathode active material layer and the above-mentioned anode active material layer, characterized in that at least one of the above-mentioned cathode active material layer and the above-mentioned anode active material layer is the above-mentioned electrode body.

According to the present invention, the use of the above-mentioned electrode body allows all the solid state battery in which electron conductivity of the coated active material improves and reaction resistance decreases.

Figure 4:
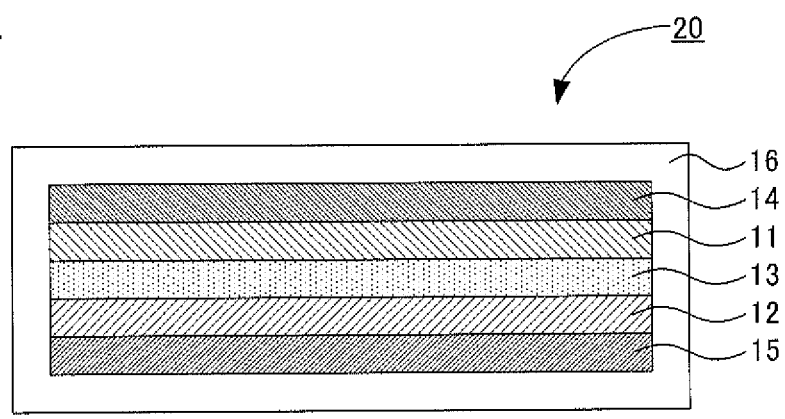
FIG. 4 is a schematic cross-sectional view showing an example of an all solid state battery of the present invention.

FIG. 4 is a schematic cross-sectional view showing an example of all the solid state battery of the present invention. An all solid state battery 20 shown in FIG. 4 comprises a cathode active material layer 11, an anode active material layer 12, a solid electrolyte layer 13 formed between the cathode active material layer 11 and the anode active material layer 12, a cathode current collector 14 for collecting the cathode active material layer 11, an anode current collector 15 for collecting the anode active material layer 12, and a battery case 16 for storing these members. All the solid state battery 20 of the present invention is greatly characterized in that at least one of the cathode active material layer 11 and the anode active material layer 12 is the electrode body described in the above-mentioned 'A. Electrode body'.

All the solid state battery of the present invention is hereinafter described in each constitution.

1. Cathode Active Material Layer

First, the cathode active material layer in the present invention is described. The cathode active material layer in the present invention is a layer containing at least the cathode active material, and may further contain at least one of a solid electrolyte material, a conductive assistant and a binder as required.

The cathode active material layer in the present invention is preferably the electrode body described in the above-mentioned 'A. Electrode body'. The reason therefor is to allow electron conductivity of the cathode active material layer to improve and reaction resistance to decrease. Incidentally, in the case where the anode active material layer is the above-mentioned electrode body, the cathode active material layer may not be the above-mentioned electrode body.

A general cathode active material may be used as the cathode active material used for the cathode active material layer except the above-mentioned electrode body. The content of the cathode active material in the above-mentioned cathode active material layer is, for example, preferably within a range of 10% by weight to 99% by weight, and more preferably within a range of 20% by weight to 90% by weight. Also, the above-mentioned cathode active material layer preferably contains a solid electrolyte material. Examples of the solid electrolyte material used for the above-mentioned cathode active material layer include a sulfide solid electrolyte material and an oxide solid electrolyte material. The content of the solid electrolyte material in the above-mentioned cathode active material layer is, for example, preferably within a range of 1% by weight to 90% by weight, and more preferably within a range of 10% by weight to 80% by weight. Also, the above-mentioned cathode active material layer may further contain a conductive assistant. Also, the cathode active material layer may further contain a binder. The conductive assistant and the binder are the same as are described in the above-mentioned 'A. Electrode body'. The thickness of the above-mentioned cathode active material layer varies with constitutions of an intended all solid state battery, and is preferably within a range of 0.1 μm to 1000 μm, for example.

2. Anode Active Material Layer

Next, the anode active material layer in the present invention is described. The anode active material layer in the present invention is a layer containing at least the anode active material, and may further contain at least one of a solid electrolyte material, a conductive assistant and a binder as required.

The anode active material layer in the present invention is preferably the electrode body described in the above-mentioned 'A. Electrode body'. The reason therefor is to allow electron conductivity of the anode active material layer to improve and reaction resistance to decrease. Incidentally, in the case where the cathode active material layer is the above-mentioned electrode body, the anode active material layer may not be the above-mentioned electrode body.

Examples of the anode active material used for the anode active material layer except the above-mentioned electrode body include a metal active material and a carbon active material. Examples of the metal active material include In, Al, Si, and Sn. On the other hand, examples of the carbon active material include graphite such as mesocarbon microbeads (MCMB) and high orientation property graphite (HOPG), and amorphous carbon such as hard carbon and soft carbon. Incidentally, SiC may be also used as the anode active material. The content of the anode active material in the above-mentioned anode active material layer is, for example, preferably within a range of 10% by weight to 99% by weight, and more preferably within a range of 20% by weight to 90% by weight. Also, the above-mentioned anode active material layer preferably contains a solid electrolyte material. The content of the solid electrolyte material in the above-mentioned anode active material layer is, for example, preferably within a range of 1% by weight to 90% by weight, and more preferably within a range of 10% by weight to 80% by weight. Incidentally, the conductive assistant and the binder used for the above-mentioned anode active material layer are the same as the above-mentioned case in the cathode active material layer. The thickness of the above-mentioned anode active material layer varies with constitutions of an intended all solid state battery, and is preferably within a range of 0.1 μm to 1000 μm, for example.

3. Solid Electrolyte Layer

Next, the solid electrolyte layer in the present invention is described. The solid electrolyte layer in the present invention is a layer formed between the cathode active material layer and the anode active material layer, and a layer containing at least the solid electrolyte material. The solid electrolyte material is not particularly limited if the solid electrolyte material has ion conductivity, but examples thereof include a sulfide solid electrolyte material and an oxide solid electrolyte material, and preferably a sulfide solid electrolyte material, above all.

The content of the solid electrolyte material in the solid electrolyte layer is, for example, preferably within a range of 10% by weight to 100% by weight, and more preferably within a range of 50% by weight to 100% by weight. Also, the solid electrolyte layer may contain a binder. Examples of the binder include fluorine-containing binders such as PTFE and PVDF. The thickness of the solid electrolyte layer is not particularly limited but is, for example, preferably within a range of 0.1 μm to 1000 μm, and more preferably within a range of 0.1 μm to 300 μm.

4. Other Constitutions

All the solid state battery of the present invention comprises at least the above-mentioned cathode active material layer, anode active material layer and solid electrolyte layer, ordinarily further comprising a cathode current collector for collecting currents from the cathode active material layer and an anode current collector for collecting currents from the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with uses of all the solid state battery and other factors. Also, a battery case of a general all solid state battery may be used for a battery case used for the present invention. Examples of the battery case include a battery case made of SUS.

5. All Solid State Battery

Examples of kinds of all the solid state battery of the present invention include an all solid lithium battery, an all solid sodium battery, an all solid magnesium battery and an all solid calcium battery; and above all, preferably an all solid lithium battery. Also, the all solid state battery of the present invention may be a primary battery or a secondary battery, and preferably a secondary battery among them. The reason therefor is to be repeatedly charged and discharged and be useful as a car-mounted battery, for example. Examples of the shape of all the solid state battery of the present invention include a coin shape, a laminate shape, a cylindrical shape and a rectangular shape. Also, a producing method for all the solid state battery of the present invention is not particularly limited if the method is a method such as to allow the above-mentioned all solid state battery, but the same method as a producing method for a general all solid state battery may be used.

C. Method for Producing Coated Active Material

Next, a method for producing a coated active material of the present invention is described. The method for producing a coated active material of the present invention comprises steps of: a preparation step of preparing a coating liquid for forming a coat layer obtained by mixing an oxide solid electrolyte material precursor solution containing a raw material of an oxide solid electrolyte material and a conductive assistant dispersion liquid containing a conductive assistant, and a coating step of coating and drying the above-mentioned coating liquid for forming a coat layer on an oxide active material to thereby form a coat layer for coating the surface of the above-mentioned oxide active material.

According to the present invention, the use of the coating liquid for forming a coat layer obtained by mixing the oxide solid electrolyte material precursor solution and the conductive assistant dispersion liquid allows the coated active material in which interface resistance may be restrained from increasing and electron conductivity improves. Also, the formation of the coat layer by a liquid-phase method (a wet method) allows the coat layer in a filmy shape with no grain boundaries to be uniformly formed, and allows the coated active material with no grain boundary resistivity to be obtained. In addition, in the case of forming the coat layer by a dry method, the conductive assistant in a fibrous shape such as carbon nanotube (CNT) is so strong in cohesive force as to be disentangled insufficiently and dispersed with difficulty in the coat layer, while even the conductive assistant strong in cohesive force may achieve high dispersibility by reason of forming the coat layer by a wet method in the present invention.

Figure 5:
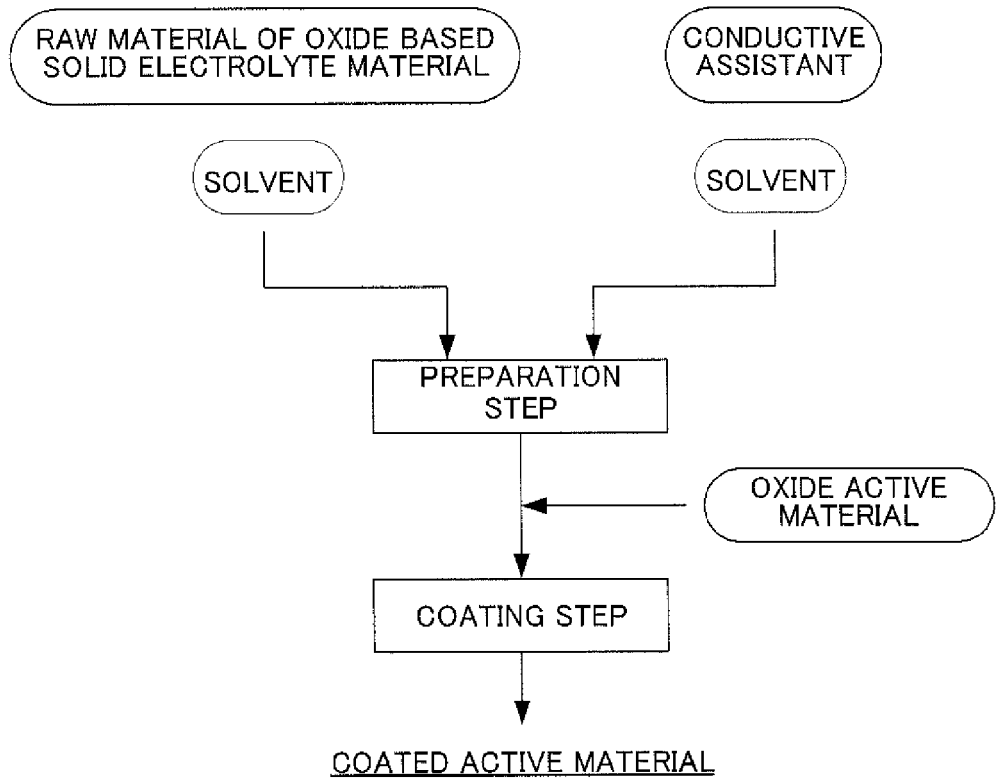
FIG. 5 is a flow chart showing an example of a method for producing a coated active material of the present invention.

FIG. 5 is a flow chart showing an example of the method for producing a coated active material of the present invention. In FIG. 5, first, the oxide solid electrolyte material precursor solution such that a raw material of an oxide solid electrolyte material is mixed into a solvent and the conductive assistant dispersion liquid such that a conductive assistant is mixed into a solvent and subjected to dispersal treatment are produced and mixed to thereby prepare the coating liquid for forming a coat layer (preparation step). Next, the coating liquid for forming a coat layer is coated and dried on an oxide active material by using a tumbling flow bed coating apparatus to thereby form the coat layer for coating the surface of the above-mentioned oxide active material (coating step) and then obtain the coated active material.

The method for producing a coated active material of the present invention is hereinafter described in each step.

1. Preparation Step

First, the preparation step in the present invention is described. The preparation step in the present invention is a step of preparing a coating liquid for forming a coat layer obtained by mixing an oxide solid electrolyte material precursor solution containing a raw material of an oxide solid electrolyte material and a conductive assistant dispersion liquid containing a conductive assistant. Incidentally, the coating liquid for forming a coat layer prepared by the present step is ordinarily a sol-gel liquid.

(1) Oxide Solid Electrolyte Material Precursor Solution

The oxide solid electrolyte material precursor solution in the present invention contains a raw material of an oxide solid electrolyte material, and is ordinarily obtained by dissolving or disperSing a raw material of an oxide solid electrolyte material in a solvent. Incidentally, examples of the oxide solid electrolyte material include the same as the oxide solid electrolyte material described in the above-mentioned 'A. Electrode body'.

The raw material of an oxide solid electrolyte material in the present invention is not particularly limited if the raw material may form the coat layer containing an oxide solid electrolyte material, but, for example, in the case where an oxide solid electrolyte material is an ion conductive oxide having a Li element, A element and O element, an Li source compound and an A source compound may be used as the raw material of the above-mentioned oxide solid electrolyte material. Incidentally, the above-mentioned A is not particularly limited but examples thereof include P, B, Si, Ge, Nb, Ti and Zr. Examples of the Li source compound include Li alkoxide such as ethoxylithium and methoxylithium, lithium acetate, and lithium hydroxide. Examples of the A source compound include an alkoxide containing A, acetate, and hydroxide. In the case where the above-mentioned A is Nb, examples of an Nb source compound include Nb alkoxide such as pentaethoxyniobium and pentamethoxyniobium, niobium acetate, and niobium hydroxide.

The solvent used for the oxide solid electrolyte material precursor solution in the present invention is not particularly limited if the solvent is not such as to deteriorate the raw material of the oxide solid electrolyte material, but examples thereof include ethanol. Incidentally, the above-mentioned solvent preferably has less moisture amount.

The ratio of the raw material of the oxide solid electrolyte material contained in the oxide solid electrolyte material precursor solution in the present invention is preferably selected properly in accordance with compositions of the coat layer of an intended coated active material.

(2) Conductive Assistant Dispersion Liquid

The conductive assistant dispersion liquid in the present invention contains a conductive assistant, and is ordinarily obtained by dispersing a conductive assistant in a solvent. Incidentally, the conductive assistant is the same as the contents described in the above-mentioned 'A. Electrode body'; therefore, the description herein is omitted.

The solvent used for the conductive assistant dispersion liquid in the present invention is not particularly limited if the solvent is not such as to deteriorate the conductive assistant, but examples thereof include ethanol. Incidentally, the above-mentioned solvent preferably has less moisture amount.

A method for dispersing the conductive assistant in a solvent is not particularly limited if the method is a method which may disperse highly, but examples thereof include ultrasonic dispersion.

The ratio of the conductive assistant contained in the conductive assistant dispersion liquid in the present invention is preferably selected properly in accordance with compositions of the coat layer of an intended coated active material.

(3) Coating Liquid for Forming Coat Layer

The mixing ratio between the above-mentioned oxide solid electrolyte material precursor solution and the above-mentioned conductive assistant dispersion liquid used for the coating liquid for forming a coat layer in the present invention is preferably selected properly in accordance with compositions of the coat layer of an intended coated active material. Also, a method for preparing the above-mentioned coating liquid for forming a coat layer is not particularly limited but the above-mentioned oxide solid electrolyte material precursor solution is preferably added to the above-mentioned conductive assistant dispersion liquid, sufficiently stirred and mixed.

2. Coating Step

Next, the coating step in the present invention is described. The coating step in the present invention is a step of coating and drying the above-mentioned coating liquid for forming a coat layer on an oxide active material to thereby form a coat layer for coating the surface of the above-mentioned oxide active material. Incidentally, the oxide active material is the same as the contents described in the above-mentioned 'A. Electrode body'; therefore, the description herein is omitted.

Examples of a method for coating the above-mentioned coating liquid for forming a coat layer on the oxide active material include a tumbling flow coating method, a spray method, an immersion method and a spray dryer method; preferably a tumbling flow coating method, above all. The reason therefor is to allow the coat layer with high uniformity.

In the present invention, drying treatment is ordinarily performed after coating the above-mentioned coating liquid for forming a coat layer on the surface of the above-mentioned oxide active material. Thus, the solvent of the above-mentioned coating liquid for forming a coat layer is volatilized to form the coat layer for coating the surface of the above-mentioned oxide active material. Incidentally, the coating step may be performed only once or repeated plural times. The intake air temperature of the drying treatment is not particularly limited if the temperature is a temperature which may volatilize the solvent, but is, for example, preferably within a range of 30° C. to 100° C., and more preferably within a range of 40° C. to 70° C. The reason therefor is that too low intake air temperature slows down volatilization rate of the solvent, while too high intake air temperature brings a possibility of deteriorating the coated active material.

Also, in the present invention, heat treatment may be performed after the coating step in a temperature range in which the oxide active material and the coat layer are not deteriorated. The performance of heat treatment allows the solvent, which may remain inside the coat layer, to be removed and allows densification of the coat layer to be promoted.

3. Coated Active Material

The coated active material obtained by the present invention is ordinarily used for a battery. The use of the above-mentioned coated active material allows the battery in which reaction resistance decreases while restraining interface resistance between the oxide active material and another substance such as a sulfide solid electrolyte material from increasing.

The present invention is not limited to the above-mentioned embodiments. The above-mentioned embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example

Preparation of Coating Liquid for Forming Coat Layer

First, mixed liquid in which 0.34 g of carbon nanotube with an average diameter of 1.4 nm (CNT™, manufactured by MEIJO NANO CARBON Co., Ltd.) was mixed into 600 g of dehydrated ethanol (manufactured by Wake Pure Chemical Industries, Ltd.) was subject to dispersal treatment with an ultrasonic disperser to produce a conductive assistant dispersion liquid.

Next, 10.83 g of ethoxylithium ($C_2H_5OLi$, manufactured by Kojundo Chemical Lab. Co., Ltd.) and 66.27 g of pentaethoxyniobium (($C_2H_5O)_5Nb$, manufactured by Kojundo Chemical Lab. Co., Ltd.) were mixed into 340 g of dehydrated ethanol (manufactured by Wako Pure Chemical Industries, Ltd.) so as to be Li:Nb=1:1 to produce an oxide solid electrolyte material precursor solution.

In addition, the conductive assistant dispersion liquid was added to the oxide solid electrolyte material precursor solution, sufficiently stirred and mixed to thereby prepare a coating liquid for forming a coat layer. Incidentally, in the above-mentioned coating liquid for forming a coat layer, the amount of CNT was 1 wt % with respect to the amount of the oxide solid electrolyte material, and $LiNbO_3$ raw material was charged so that a coat layer with a thickness of approximately 7 nm was formed on the surface of an active material.

(Production of Coated Active Material)

500 g of an active material ($LiNi_{1/3}Co_{1/3}Mn_{1/3}O_2$) was flown in a tumbling flow bed coating apparatus (manufactured by Powrex Corp.) to coat the above-mentioned coating liquid for forming a coat layer on the surface of the active material. Thereafter, the liquid was dried at an intake air temperature of 50° C. to thereby form a coat layer for coating the surface of the active material and then obtain a coated active material.

COMPARATIVE EXAMPLE

A coated active material was obtained in the same manner as Example except for regarding the oxide solid electrolyte material precursor solution, which was produced while modifying the amount of dehydrated ethanol into 500 g, as the coating liquid for forming a coat layer without producing the conductive assistant dispersion liquid.

[Evaluations]

(TEM Observation)

Figure 6A:
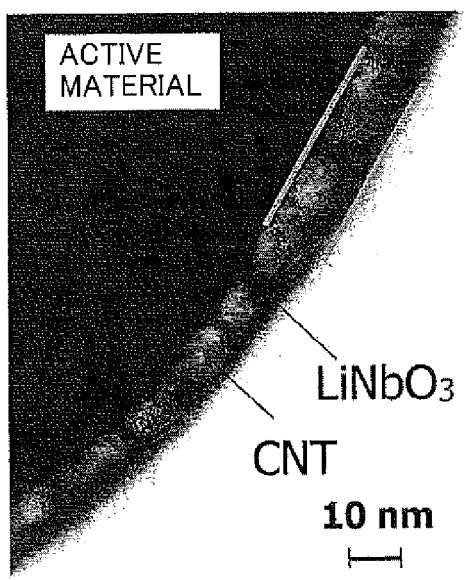
FIGS. 6A and 6B are each a TEM image of a cross section of a coated active material obtained in Example and Comparative Example.
Figure 6B:
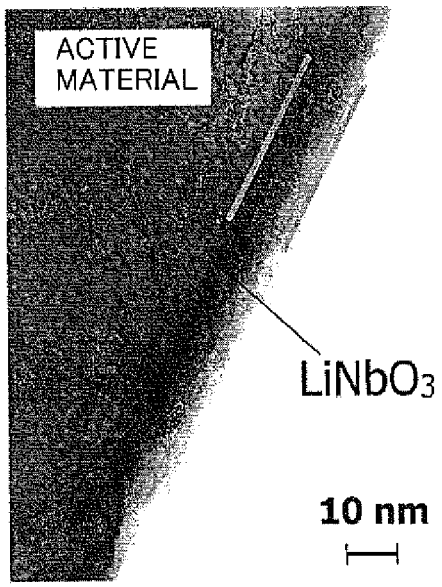

With regard to the form of the coat layer cross section of the coated active material obtained in Example and Comparative Example, a sample subject to FIB processing was observed by TEM (a transmission electron microscope). The results of Example and Comparative Example are shown in FIGS. 6A and 6B respectively. As shown in FIG. 6A, it was confirmed in the coated active material obtained in Example that CNT (the conductive assistant) was taken into the coat layer containing $LiNbO_3$ (the oxide solid electrolyte material). On the other hand, as shown in FIG. 63, the coat layer containing $LiNbO_3$ (the oxide solid electrolyte material) was confirmed in the coated active material obtained in Comparative Example.

(Powder Resistance Measurement)

Figure 7:
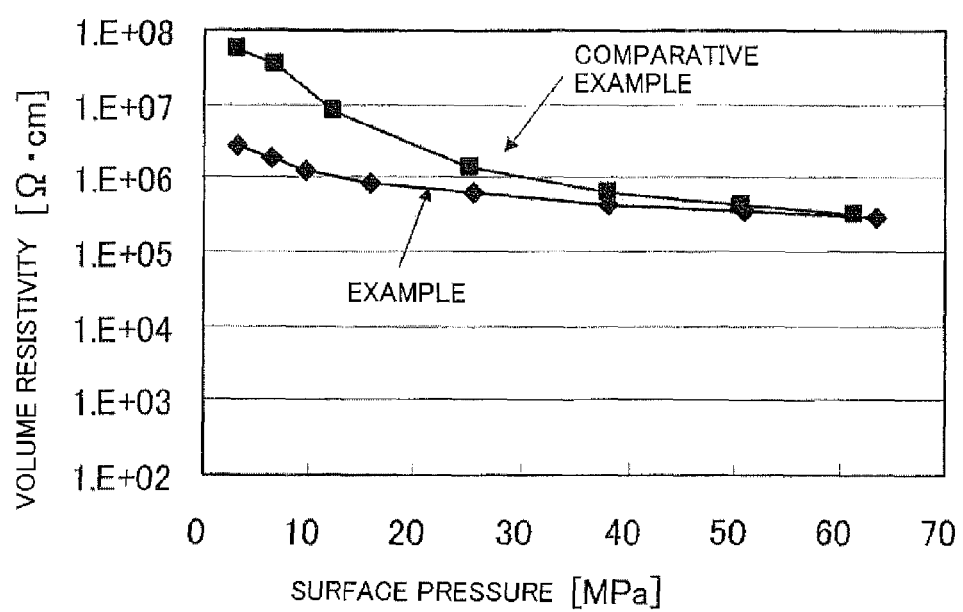
FIG. 7 is a graph showing a result of measuring powder resistance of a coated active material obtained in Example and Comparative Example.

The powder resistance of the coated active material obtained in Example and Comparative Example was measured. The powder resistance was measured by the simple substance of the powder with the use of a resistivity meter (Loresta GP MCP-T610 type, manufactured by Mitsubishi Chemical Analytech Co., Ltd.). The result is shown in FIG. 7. As shown in FIG. 7, it was confirmed in the coated active material obtained in Example that the powder resistance value (volume resistivity) on the low surface pressure condition decreased by one digit or more as compared with the coated active material obtained in Comparative Example. The reason therefor is conceived to be that CNT was added to the coat layer.

REFERENCE SIGNS LIST

1 . . . oxide active material
2 . . . coat layer
3 . . . conductive assistant
4 . . . coated active material
5 . . . sulfide solid electrolyte material
10 . . . electrode body
11 . . . cathode active material layer
12 . . . anode active material layer
13 . . . solid electrolyte layer
14 . . . cathode current collector
15 . . . anode current collector
16 . . . battery case
20 . . . all solid state battery

The invention claimed is:

1. An electrode body comprising
   a coated active material having an oxide active material and a coat layer for coating a surface of the oxide active material, containing an oxide solid electrolyte material, and
   a sulfide solid electrolyte material contacting with the coated active material;
   wherein the coat layer contains a conductive assistant and is in a filmy shape with no grain boundaries.

2. The electrode body according to claim 1, wherein the conductive assistant is a carbon nanotube.

3. An all solid state battery comprising
   a cathode active material layer containing a cathode active material,
   an anode active material layer containing an anode active material, and
   a solid electrolyte layer formed between the cathode active material layer and the anode active material layer;

wherein at least one of the cathode active material layer and the anode active material layer is the electrode body according to claim 1.

4. A method for producing a coated active material, comprising steps of:

a preparation step of preparing a coating liquid for forming a coat layer obtained by mixing an oxide solid electrolyte material precursor solution containing a raw material of an oxide solid electrolyte material and a conductive assistant dispersion liquid containing a conductive assistant; and a coating step of coating and drying the coating liquid for forming a coat layer on an oxide active material to thereby form a coat layer in a filmy shape with no grain boundaries for coating a surface of the oxide active material.

* * * * *